United States Patent
Czeskis et al.

(10) Patent No.: US 10,050,960 B1
(45) Date of Patent: Aug. 14, 2018

(54) METHODS AND SYSTEMS OF ADDING A USER ACCOUNT TO A DEVICE

(71) Applicant: Google LLC, Mountain View, CA (US)

(72) Inventors: Alexei Czeskis, Mountain View, CA (US); Dirk Balfanz, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/245,530

(22) Filed: Aug. 24, 2016

Related U.S. Application Data

(62) Division of application No. 14/182,840, filed on Feb. 18, 2014, now Pat. No. 9,449,160.

(51) Int. Cl.
| | |
|---|---|
| *H04L 29/06* | (2006.01) |
| *H04H 20/38* | (2008.01) |
| *H04L 29/08* | (2006.01) |
| *G06F 3/16* | (2006.01) |
| *G06F 17/30* | (2006.01) |

(52) U.S. Cl.
CPC .......... *H04L 63/0861* (2013.01); *G06F 3/167* (2013.01); *G06F 17/30743* (2013.01); *H04H 20/38* (2013.01); *H04L 63/102* (2013.01); *H04L 67/306* (2013.01)

(58) Field of Classification Search
CPC . H04L 63/0853; H04L 63/101; H04L 63/107; H04L 67/12; H04L 61/2038; H04L 9/32; H04W 12/06; G07C 9/00111; H04B 7/00; H04M 1/00
USPC ............. 370/320, 338; 455/415, 418, 456.3; 713/155, 168; 726/2–5, 9; 348/E5.096, 348/E7.024; 463/40; 725/109, 110, 131, 725/63, 80, 81
See application file for complete search history.

(56) References Cited

U.S. PATENT DOCUMENTS

| | | | | |
|---|---|---|---|---|
| 7,366,551 | B1* | 4/2008 | Hartley | H04M 1/72575 455/411 |
| 8,190,198 | B1* | 5/2012 | Venkataramu | H04L 63/0853 370/320 |
| 8,555,337 | B2 | 10/2013 | Blom et al. | |
| 8,886,531 | B2* | 11/2014 | Vogel | G10L 25/48 700/94 |
| 9,628,514 | B2* | 4/2017 | Kaufman | H04L 67/14 |
| 2005/0086697 | A1* | 4/2005 | Haseltine | G06Q 30/02 725/100 |

(Continued)

*Primary Examiner* — Thanhnga B Truong
(74) *Attorney, Agent, or Firm* — Lerner, David, Littenberg, Krumholz & Mentlik, LLP

(57) ABSTRACT

A method of adding a user account to an unassociated device may include detecting, by an associated device that is associated with a user account, an audio signal broadcast by an unassociated device that is not associated with the user account, where the audio signal includes a token. The method may include sending the token to a computing device associated with a service provider of the user account, receiving, by the associated device, a command, determining that the received command is an authorization command, and in response to determining that the received command is an authorization command, sending one or more authorization instructions to the computing device. The one or more authorization instructions may instruct the computing device to send one or more credentials associated with the user.

8 Claims, 3 Drawing Sheets

(56) References Cited

U.S. PATENT DOCUMENTS

| | | |
|---|---|---|
| 2006/0130131 A1* | 6/2006 | Pai .................. H04L 63/0823 |
| | | 726/9 |
| 2007/0286376 A1 | 12/2007 | Maximo et al. |
| 2007/0296818 A1* | 12/2007 | Porwal ................ H04R 1/403 |
| | | 348/163 |
| 2009/0232310 A1 | 9/2009 | Holtmanns et al. |
| 2012/0204231 A1 | 8/2012 | Holtmanns et al. |
| 2015/0058226 A1 | 2/2015 | Gupta et al. |

\* cited by examiner

METHODS AND SYSTEMS OF ADDING A USER ACCOUNT TO A DEVICE

CROSS-REFERENCE TO RELATED APPLICATIONS

This application claims priority to and is a divisional of U.S. patent application Ser. No. 14/182,840 filed Feb. 18, 2014, the disclosure of which is incorporated herein by reference in its entirety.

BACKGROUND

The process of adding a user account to a device is commonly referred to as "bootstrapping" the device. Typically, a user can bootstrap a device by typing a username, password, code and/or the like associated with the user account to be added to the device. However, this process is lacking in both security and usability.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of adding a user account to an unassociated device may include detecting, by an associated device that is associated with a user account, an audio signal broadcast by an unassociated device that is not associated with the user account, where the audio signal includes a token. The method may include sending the token to a computing device associated with a service provider of the user account, receiving, by the associated device, a command, determining that the received command is an authorization command, and in response to determining that the received command is an authorization command, sending one or more authorization instructions to the computing device. The one or more authorization instructions may instruct the computing device to send one or more credentials associated with the user account to the unassociated device in order to add the user account to the unassociated device.

In an embodiment, a method of adding a user account to an unassociated device may include sending, by an unassociated device that is not associated with a user account, a request to a computing device associated with a service provider of the user account, where the request includes device information associated with the unassociated device. The method may include receiving a token by the unassociated device from the computing device, broadcasting an audio signal that includes the received token, receiving one or more credentials associated with the user account from the computing device in response to the computing device receiving one or more authorization instructions from an associated device that is associated with the user account, and using the received credentials to add the user account to the unassociated device.

In an embodiment, a method of adding a user account to an unassociated device may include receiving, by a computing device associated with a service provider of a user account, a request from an unassociated device, where the request includes device information associated with the unassociated device. The unassociated device may not be associated with the user account. The method may include generating, by the computing device, a token, storing the token and device information, sending the token to the unassociated device, and receiving the token and one or more authorization instructions from an associated device. The one or more authorization instructions may be associated with an authorization command received by the associated device, and the associated device may be associated with the user account. The method may include using, by the computing device, the received token to identify the unassociated device, and sending, by the computing device to the unassociated device, one or more credentials associated with the user account that will allow the user account to be added to the unassociated device.

In an embodiment, a system of adding a user account to an unassociated device may include an associated device that is associated with a user account, and a computer-readable storage medium in communication with the associated device. The computer-readable storage medium may include one or more programming instructions that, when executed, cause the associated device to detect an audio signal broadcast by an unassociated device that is not associated with the user account where the audio signal comprises a token, send the token to a computing device associated with a service provider of the user account, receive a command, determine that the received command is an authorization command, and in response to determining that the received command is an authorization command, send one or more authorization instructions to the computing device. The one or more authorization instructions may instruct the computing device to send one or more credentials associated with the user account to the unassociated device in order to add the user account to the unassociated device.

In an embodiment, a system of adding a user account to an unassociated device may include an unassociated device that is not associated with a user account, and a computer-readable storage medium in communication with the unassociated device. The computer-readable storage medium may include one or more programming instructions that, when executed, cause the unassociated device to send a request to a computing device associated with a service provider of the user account, where the request comprises device information associated with the unassociated device, receive a token, broadcast an audio signal that comprises the received token, receive one or more credentials associated with the user account from the computing device in response to the computing device receiving one or more authorization instructions from an associated device that is associated with the user account, and use the received credentials to add the user account to the unassociated device.

In an embodiment, a system of adding a user account to an unassociated device may include a computing device associated with a service provider of a user account, and a computer-readable storage medium in communication with the unassociated device. The computer-readable storage medium may include one or more programming instructions that, when executed, cause the unassociated device to receive a request from an unassociated device, where the request comprises device information associated with the unassociated device, and the unassociated device is not associated with the user account. The computer-readable storage medium may include one or more programming instructions that, when executed, cause the unassociated device to generate a token, store the token and device information, send the token to the unassociated device, and receive the token and one or more authorization instructions from an associated device. The one or more authorization instructions may be associated with an authorization command received by the associated device, and the associated device may be associated with the user account. The computer-readable storage medium may include one or more programming instructions that, when executed, cause the unassociated device to use the received token to identify the unassociated device, and send, to the unassociated device, one or more credentials associated with the user account that will allow the user account to be added to the unassociated device.

DETAILED DESCRIPTION

The following terms shall have, for purposes of this application, the respective meanings set forth below:

An "associated device" refers to a device, such as a computing device, that is associated with a user account.

A "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like. When used in the claims, reference to "a computing device" may include a single device, or it may refer to any number of devices having one or more processors that communicate with each other and share data and/or instructions to perform the claimed steps.

An "unassociated device" refers to a device, such as a computing device, that is to be associated with a user account.

A "user account" refers to information that informs a service provider as to a user's settings, preferences, access privileges, and/or the like. A user account may be accessed via one or more credentials such as a login, a password, a biometric, and/or the like.

Figure 1:
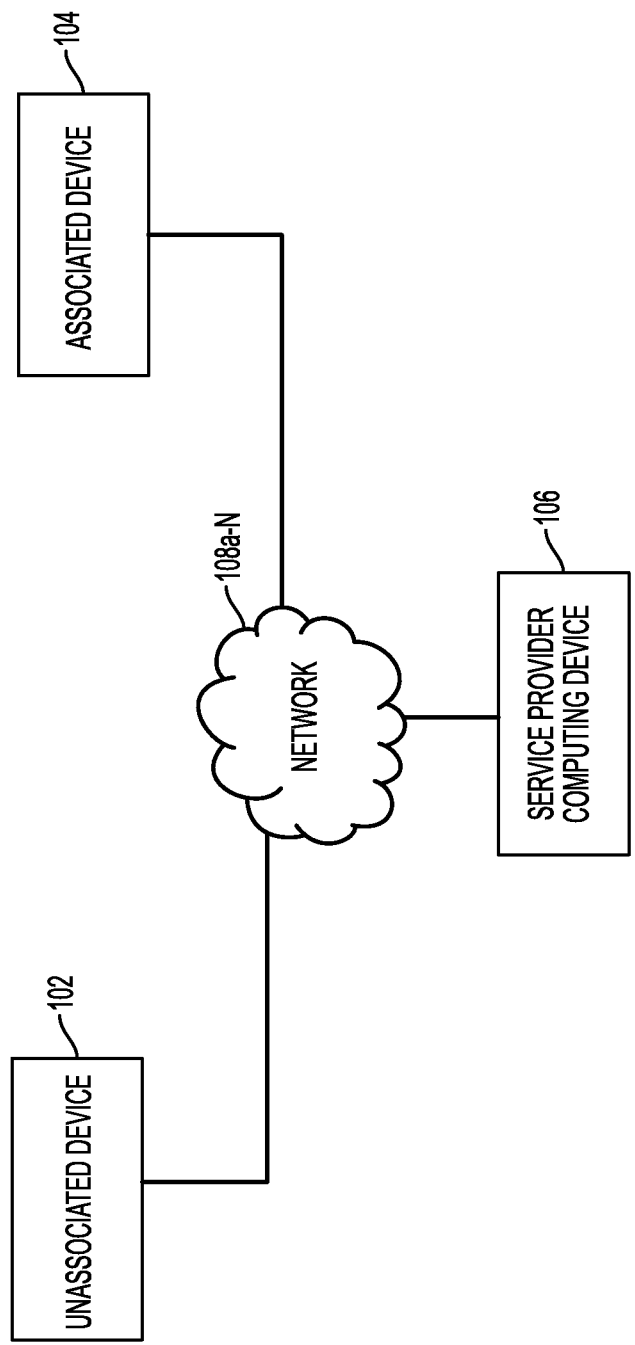
FIG. 1 illustrates an example system for adding a user account to an unassociated device according to an embodiment.

FIG. 1 illustrates an example system for adding a user account to an unassociated device according to an embodiment. As illustrated by FIG. 1, the system 100 may include an unassociated device 102, an associated device 104, a service provider computing device 106 and one or more networks 108a-N. In an embodiment, an associated 104 is a computing device of a user that is already associated with a user account. For example, an associated device may be a mobile phone that has already been configured with a user's account. An associated device may be capable of broadcasting one or more audible signals, such as, for example, an ultrasound signal.

In an embodiment, an unassociated device is a device that has not yet been configured with a user's account. For example, an unassociated device may be a new device that a user has purchased or otherwise acquired. In an embodiment, an unassociated device may include one or more components that are capable of detecting and deciphering one or more audio signals. For instance, an unassociated device may include a microphone. Examples of associated devices and/or unassociated devices may include, without limitation, tablets, mobile phones, laptop computers, desktop computers and/or the like.

In an embodiment, a service provider computing device may be a computing device associated with a service provider of a user account. Examples of a service provider computing device may include without limitation, a laptop computer, a desktop computer, a tablet, a mobile device, a server, a mainframe or other computing device.

As illustrated by FIG. 1, an associated device, an unassociated device and/or a service provider computing device may communicate with one another via one or more communication networks. A communication network may be a local area network (LAN), a wide area network (WAN), a mobile or cellular communication network, an extranet, an intranet, the Internet and/or the like.

Figure 2:
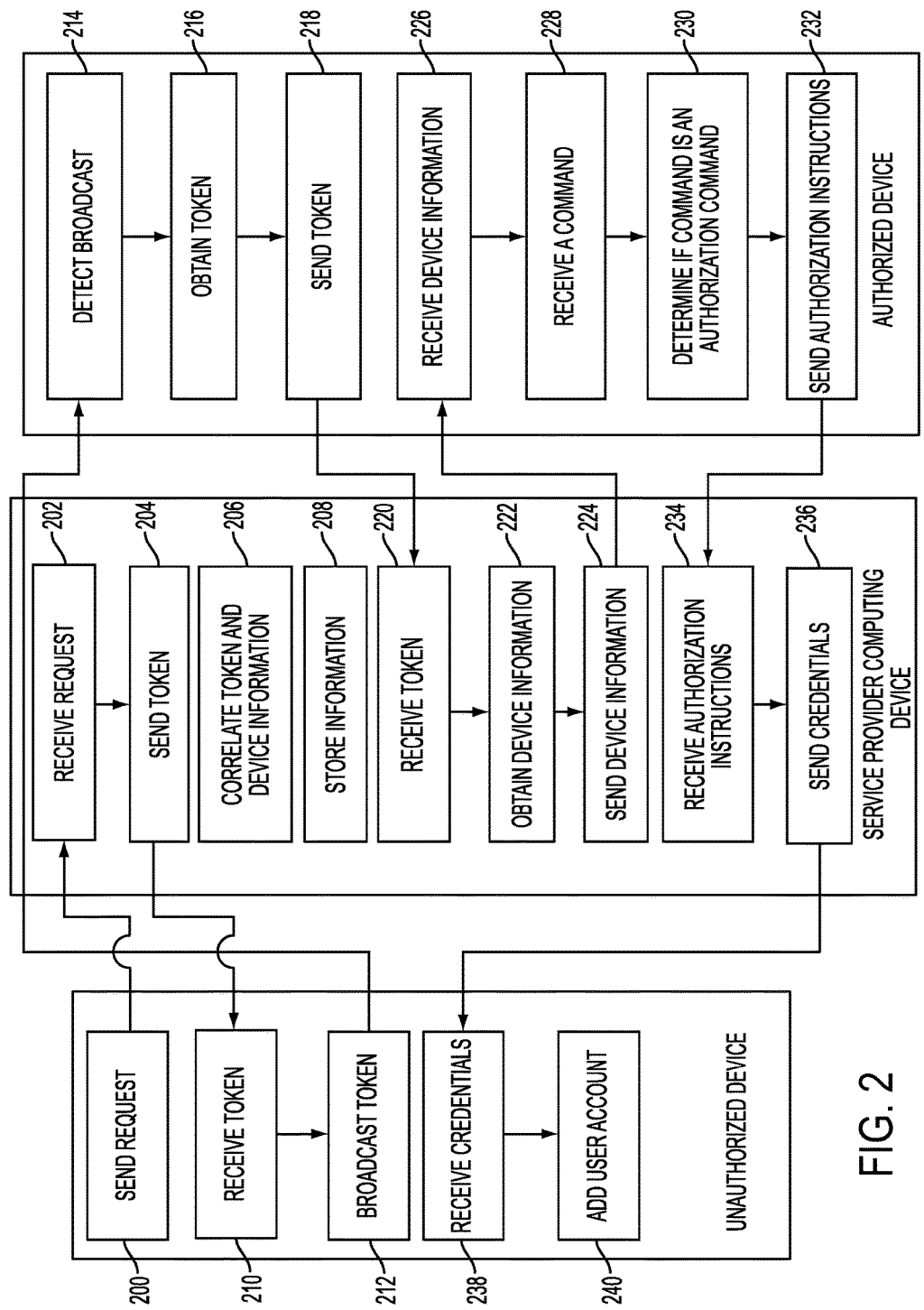
FIG. 2 illustrates a flow chart of an example method of adding a user account to an unassociated device according to an embodiment.

FIG. 2 illustrates a flow chart of an example method of adding a user account to an unassociated device according to an embodiment. As illustrated by FIG. 2, an unassociated device may send 200 a request to a service provider computing device. The request may include device information pertaining to the unassociated device such as, for example, a make, a model, and/or unique identifier of the unassociated device.

The service provider computing device may receive 202 the request, and may send 204 a token to the unassociated device. The token may or may not be encrypted or otherwise obfuscated. In an embodiment, the service provider computing device may correlate 206 the received device information with an indication of the token that it sent to the unassociated device, and may store 208 this information. The service provider computing device may store 208 the device information and token information in a list, database, table and/or other memory associated with the service provider computing device.

As illustrated by FIG. 2, the unassociated device may receive 210 the token from the service provider computing device. The unassociated device may broadcast 212 the token. For example, the unassociated device may broadcast 212 the token as part of an audible signal. In an embodiment, the unassociated device may broadcast 212 the token via ultrasound.

An associated device may detect 214 the audible signal broadcast by the unassociated device. For example, the associated device may be in proximity of the unassociated device, and may, using its microphone or other receiver, detect 214 the audible signal of the unassociated device. The associated device may parse the signal to obtain 216 the token.

The associated device may send 218 the token to the service provider computing device. The service provider computing device may receive 220 the token from the associated device, and may use the received token to obtain 222 at least a portion of the device information associated with the unassociated device. The service provider computing device may send 224 the obtained device information to the associated device, and the associated device may receive 226 such information.

The associated device may receive 228 a command from a user. A command may be a voice command that is received 228 by a microphone or another receiver. In an embodiment, a command may be one that is received via one or more input devices of the associated device. The associated device may determine 230 whether the received command is an authorization command. An authorization command may be one or more instructions that instruct the associated device to bootstrap the unassociated device with the user's credentials. In an embodiment, the associated device may determine 230 whether the received command is an authorization command by comparing the received command to one or more known authorization commands to determine whether they match or substantially match. If so, the received command may be considered an authorization command.

In an embodiment, an authorization command may be one or more verbal instructions that may be detected by the associated device, such as, for example, via a microphone. For example, a user may speak the authorization command "Hello, device. I got a new tablet." The associated device may detect this voice command using its microphone, and the voice command may serve as authorization for the user's associated device to bootstrap the unassociated device. Additional and/or alternate words, phrases and/or sentences may be used as authorization commands according to this disclosure.

In an embodiment, an authorization command may be received via one or more entries using the associated device. For example, a user may provide an authorization command by typing one or more characters on an associated device, making one or more selections using the associated device, pressing one or more buttons on the associated device and/or the like.

An associated device may prompt a user to provide an authorization command according to an embodiment. For example, an associated device may display and/or speak a message to a user informing the user of how to add the user's account to the unassociated device. For example, an associated device may display a message on the associated device that reads "Hello, user. Do you want to add your account to the unassociated device? If so, please say. 'Hello. I got a new device' or touch this message." Accordingly, a user may provide an authorization command to the associated device by speaking the phrase "Hello. I got a new device" or by touching the displayed message. Additional and/or alternate messages and/or authorization commands may be used within the scope of this disclosure.

In an embodiment, an authorization command may be specific to an unassociated device. For example, a user may have two or more unassociated devices the user would like to bootstrap, such as, for example, a mobile phone and a tablet. The authorization command "Hello. I got a new tablet" may be used to bootstrap the tablet, while the authorization command "Hello. I got a new phone" may be used to bootstrap the mobile phone. As another example, the authorization command "Hello. Please sign me in" may be used to bootstrap one device, while the authorization command "Hello. Please log me in" may be used to bootstrap the other device. Additional and/or alternate authorization commands may be used within the scope of this disclosure.

An associated device may prompt a user to provide an authorization command that is specific to the unassociated device to be bootstrapped according to an embodiment. For example, an associated device may display and/or speak a message to a user informing the user that more than one unassociated device was recognized and provide information that the user can use to bootstrap one or more of the unassociated devices. For example, an associated device may display the message: "Hello, user. Do you want to add your account to the unassociated tablet? If so, please say 'Hello. I got a new tablet.' Do you want to add your account to the unassociated mobile phone? If so, please say 'Hello. I got a new phone.'"

The associated device may send 232 one or more authorization instructions to the service provider computing device, which may receive 234 the authorization instructions. The service provider computing device may send 236 at least a portion of the user's account credentials to the unassociated device. In an embodiment, the service provider computing device may send 236 at least a portion of the user's account credentials in any suitable format such as, for example, as a short-range communication, as an OAuth token and/or the like.

In an embodiment, before a service provider computing device sends 236 the user's account credentials to the unassociated device, the service provider computing device may verify that the associated device and the unassociated device are in proximity to one another. The service provider computing device may receive an audio fingerprint of the ambient environment from both the associated device and the unassociated device. An audio fingerprint may be a digital summary that is generated from an audio signal that can be used to identify an audio sample. For example, an associated device and/or an unassociated device may create an audio recording of its environment or surroundings, and may generate a corresponding audio fingerprint associated with the recording.

The service provider computing device may compare the two audio fingerprints to determine if they are similar enough that it is likely the associated device and unassociated device are in proximity to one another. If the service provider computing device determines that it is likely that the associated device and unassociated device are in proximity to one another, the service provider computing device may send 236 the user's account credentials to the unassociated device. Otherwise, the service provider computing device may not send 236 the user's account credentials to the unassociated device.

The unassociated device may receive 238 the user's account credentials from the service provider computing device, and may use the received credentials to add 240 the user's user account to the unassociated device.

In situations in which the systems discussed here collect personal information about users, or may make use of personal information, the users may be provided with an opportunity to control whether programs or features collect user information, or to control whether and/or how to receive content that may be more relevant to the user. In addition, certain data may be treated in one or more ways before it is stored or used so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the system.

Figure 3:
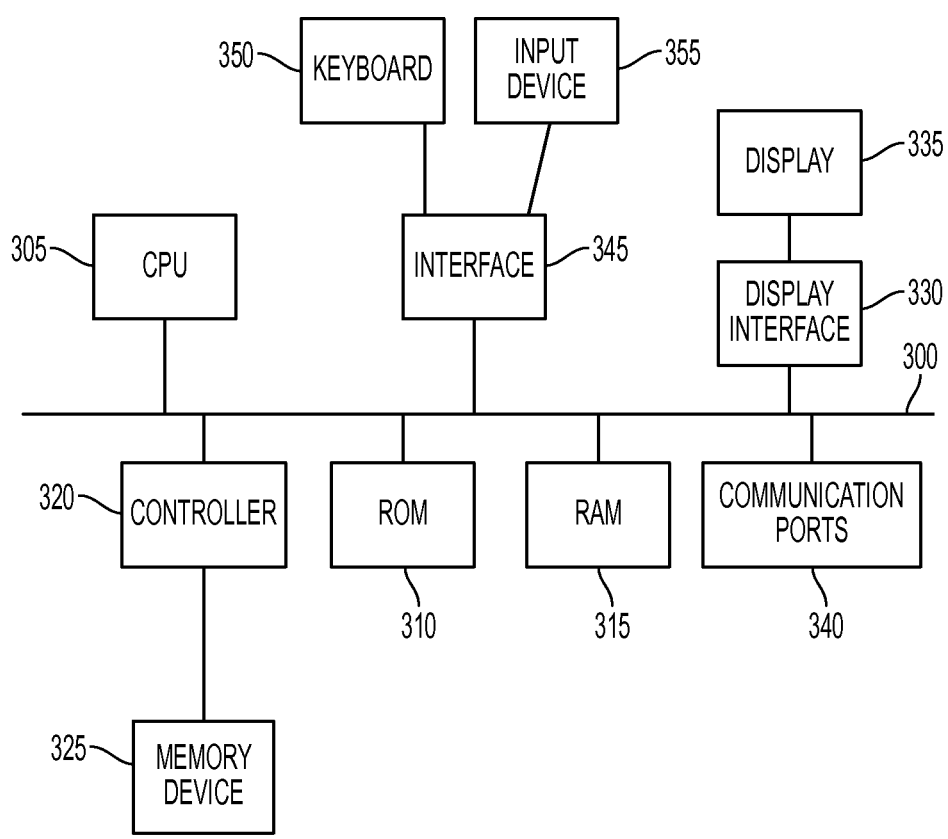
FIG. 3 illustrates a block diagram of example hardware that may be used to contain or implement program instructions according to an embodiment.

FIG. 3 depicts a block diagram of hardware that may be used to contain or implement program instructions. A bus 300 serves as the main information highway interconnecting the other illustrated components of the hardware. CPU 305 is the central processing unit of the system, performing calculations and logic operations required to execute a program. CPU 305, alone or in conjunction with one or more of the other elements disclosed in FIG. 3, is an example of a production device, computing device or processor as such terms are used within this disclosure. Read only memory (ROM) 310 and random access memory (RAM) 315 constitute examples of non-transitory computer-readable storage media.

A controller 320 interfaces with one or more optional non-transitory computer-readable storage media 325 to the system bus 300. These storage media 325 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 310 and/or the RAM 315. Optionally, the program instructions may be stored on a tangible, non-transitory computer-readable medium such as a compact disk, a digital disk, flash memory, a memory card, a USB drive, an optical disc storage medium and/or other recording medium.

An optional display interface 330 may permit information from the bus 300 to be displayed on the display 335 in audio, visual, graphic or alphanumeric format. Communication with external devices, such as a printing device, may occur using various communication ports 340. A communication port 340 may be attached to a communication network, such as the Internet or an intranet.

The hardware may also include an interface 345 which allows for receipt of data from input devices such as a keyboard 350 or other input device 355 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of adding a user account to an unassociated device, the method comprising:
   receiving, by a computing device associated with a service provider of a user account, a request from an unassociated device, wherein the request comprises device information associated with the unassociated device, wherein the unassociated device is not associated with the user account;
   generating, by the computing device, a token;
   storing the token and device information;
   sending the token to the unassociated device;
   receiving, by the computing device, the token and one or more authorization instructions from an associated device, wherein the one or more authorization instructions are associated with an authorization command received by the associated device from a user of the associated device that instructs the associated device to bootstrap the unassociated device with one or more credentials associated with the user account, wherein the associated device is associated with the user account;
   using, by the computing device, the received token to identify the unassociated device;
   verifying whether the unassociated device and the associated device are in proximity to one another before sending the one or more credentials to the unassociated device by comparing a first audio fingerprint that corresponds to an audio recording of an environment of the unassociated device and a second audio fingerprint that corresponds to an audio recording of an environment of the associated device to determine whether they are similar; and
   sending, by the computing device to the unassociated device, the one or more credentials associated with the user account that will allow the user account to be added to the unassociated device.

2. The method of claim 1, wherein the authorization command comprises one or more voice commands.

3. The method of claim 1, further comprising:
   receiving the first audio fingerprint from the unassociated device.

4. The method of claim 1, further comprising receiving the second audio fingerprint from the associated device.

5. A system of adding a user account to an unassociated device, the system comprising:
   a computing device associated with a service provider of a user account; and
   a computer-readable storage medium in communication with the computing device, wherein the computer-readable storage medium comprises one or more programming instructions that, when executed, cause the computing device to:
   receive a request from an unassociated device, wherein the request comprises device information associated with the unassociated device, wherein the unassociated device is not associated with the user account,
   generate a token,
   store the token and device information,
   send the token to the unassociated device,
   receive the token and one or more authorization instructions from an associated device, wherein the one or more authorization instructions are associated with an authorization command received by the associated device from a user of the associated device that instructs the associated device to bootstrap the unassociated device with one or more credentials associated with the user account, wherein the associated device is associated with the user account,
   use the received token to identify the unassociated device,
   verify whether the unassociated device and the associated device are in proximity to one another before sending the one or more credentials to the unassociated device by comparing a first audio fingerprint that corresponds to an audio recording of an environment of the unassociated device and a second audio fingerprint that corresponds to an audio recording of an environment of the associated device to determine whether they are similar, and send, to the unassociated device, one or more credentials associated with the user account that will allow the user account to be added to the unassociated device.

6. The system of claim 5, wherein the authorization command comprises one or more voice commands.

7. The system of claim 5, wherein the computer-readable storage medium further comprises one or more programming instructions that, when executed, cause the computing device to:

receive the first audio fingerprint from the unassociated device.

8. The system of claim 5, wherein the computer-readable storage medium further comprises one or more programming instructions that, when executed, cause the computing device to receive the second audio fingerprint from the associated device.

* * * * *